United States Patent
Oakes, III et al.

(10) Patent No.: US 7,970,677 B1
(45) Date of Patent: *Jun. 28, 2011

(54) SYSTEMS AND METHODS FOR FINANCIAL DEPOSITS BY ELECTRONIC MESSAGE

(75) Inventors: Charles Lee Oakes, III, Boerne, TX (US); Michael Frank Morris, San Antonio, TX (US); Bharat Prasad, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/257,477

(22) Filed: Oct. 24, 2008

(51) Int. Cl.
*G06Q 40/00* (2006.01)

(52) U.S. Cl. .............. 705/35; 705/42; 705/38; 235/468; 235/382

(58) Field of Classification Search .................... 705/42; 235/375; 455/414; 250/461.1; 715/229
See application file for complete search history.

(56) References Cited

U.S. PATENT DOCUMENTS

| | | | |
|---|---|---|---|
| 3,341,820 A | 9/1967 | Grillmeier, Jr. | |
| 3,576,972 A | 5/1971 | Wood | |
| 3,593,913 A | 7/1971 | Bremer | |
| 3,620,553 A | 11/1971 | Donovan | |
| 3,648,242 A | 3/1972 | Grosbard | |
| 3,816,943 A | 6/1974 | Henry | |
| 4,002,356 A | 1/1977 | Weidmann | |
| 4,060,711 A | 11/1977 | Buros | |
| 4,128,202 A | 12/1978 | Buros | |
| 4,136,471 A | 1/1979 | Austin | |
| 4,205,780 A | 6/1980 | Burns | |
| 4,264,808 A | 4/1981 | Owens | |
| 4,305,216 A | 12/1981 | Skelton | |
| 4,321,672 A | 3/1982 | Braun | |
| 4,523,330 A | 6/1985 | Cain | |
| 4,636,099 A | 1/1987 | Goldstone | |
| 4,640,413 A | 2/1987 | Kaplan | |
| 4,644,144 A | 2/1987 | Chandek | |
| 4,722,444 A | 2/1988 | Murphy | |

(Continued)

FOREIGN PATENT DOCUMENTS

EP 984410 A1 3/2000

OTHER PUBLICATIONS

Mark Bruno, Instant Messaging, Bank Technology News, Dec. 2002 (IM).*

(Continued)

*Primary Examiner* — Ella Colbert
*Assistant Examiner* — Chika Ojiaku
(74) *Attorney, Agent, or Firm* — Chadbourne & Parke LLP; Walter G. Hanchuk

(57) ABSTRACT

An image of a negotiable instrument may be communicated from a user to a financial institution using a messaging application so that funds associated with the negotiable instrument may be deposited into a user's bank account. A user may launch an instant messaging application and establish a communications session with a predetermined account at the financial institution to communicate the image. The image may be stored in a file or created by a capture device under control of the instant messaging application. The image file may be processed and verified by the financial institution, where it may be deposited in an account associated with the user.

21 Claims, 4 Drawing Sheets

U.S. PATENT DOCUMENTS

| | | | |
|---|---|---|---|
| 4,727,435 A | 2/1988 | Marion | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | Mcnabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,157,620 A | 10/1992 | Shaar | |
| 5,159,548 A | 10/1992 | Caslavka | |
| 5,191,525 A | 3/1993 | LeBrun | |
| 5,220,501 A | 6/1993 | Lawlor | |
| 5,237,159 A | 8/1993 | Stephens | |
| 5,265,008 A | 11/1993 | Benton | |
| 5,321,816 A | 6/1994 | Rogan | |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,504,538 A | 4/1996 | Tsujihara | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,668,897 A | 9/1997 | Stolfo | |
| 5,673,320 A | 9/1997 | Ray | |
| 5,677,955 A | 10/1997 | Doggett | |
| 5,679,938 A | 10/1997 | Templeton | |
| 5,680,611 A | 10/1997 | Rail | |
| 5,691,524 A | 11/1997 | Josephson | |
| 5,737,440 A | 4/1998 | Kunkler | |
| 5,751,842 A | 5/1998 | Riach | |
| 5,830,609 A | 11/1998 | Warner | |
| 5,832,463 A | 11/1998 | Funk | |
| 5,863,075 A | 1/1999 | Rich | |
| 5,870,456 A | 2/1999 | Rogers | |
| 5,870,724 A | 2/1999 | Lawlor | |
| 5,878,337 A | 3/1999 | Joao | |
| 5,897,625 A | 4/1999 | Gustin | |
| 5,903,878 A | 5/1999 | Talati | |
| 5,903,881 A | 5/1999 | Schrader | |
| 5,910,988 A | 6/1999 | Ballard | |
| 5,917,931 A | 6/1999 | Kunkler | |
| 5,924,737 A | 7/1999 | Schrupp | |
| 5,926,548 A | 7/1999 | Okamoto | |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin | |
| 6,012,048 A | 1/2000 | Gustin | |
| 6,021,202 A | 2/2000 | Anderson | |
| 6,021,397 A | 2/2000 | Jones | |
| 6,029,887 A | 2/2000 | Furuhashi | |
| 6,030,000 A | 2/2000 | Diamond | |
| 6,032,137 A | 2/2000 | Ballard | |
| 6,038,553 A | 3/2000 | Hyde | |
| 6,073,119 A | 6/2000 | Bornemisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | |
| 6,189,785 B1 | 2/2001 | Lowery | |
| 6,199,055 B1 | 3/2001 | Kara | |
| 6,243,689 B1 | 6/2001 | Norton | |
| 6,278,983 B1 | 8/2001 | Ball | |
| 6,282,826 B1 | 9/2001 | Richards | |
| 6,304,860 B1 | 10/2001 | Martin, Jr. | |
| 6,314,452 B1 | 11/2001 | Dekel | |
| 6,317,727 B1 | 11/2001 | May | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,449,397 B1 | 9/2002 | Che-Chu | |
| 6,450,403 B1 | 9/2002 | Martens | |
| 6,464,134 B1 | 10/2002 | Page | |
| 6,470,325 B1 | 10/2002 | Leemhuis | |
| 6,505,178 B1 | 1/2003 | Flenley | |
| 6,574,609 B1 | 6/2003 | Downs | |
| 6,578,760 B1 | 6/2003 | Otto | |
| 6,587,837 B1 | 7/2003 | Spagna | |
| 6,609,200 B2 | 8/2003 | Anderson | |
| 6,643,416 B1 | 11/2003 | Daniels | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |
| 6,726,097 B2 | 4/2004 | Graef | |
| 6,728,397 B2 | 4/2004 | Mcneal | |
| 6,742,128 B1 | 5/2004 | Joiner | |
| 6,755,340 B1 | 6/2004 | Voss | |
| 6,763,226 B1 * | 7/2004 | McZeal, Jr. | 455/90.2 |
| 6,781,962 B1 | 8/2004 | Williams | |
| 6,786,398 B1 | 9/2004 | Stinson | |
| 6,789,054 B1 | 9/2004 | Makhlouf | |
| 6,813,733 B1 * | 11/2004 | Li et al. | 714/47 |
| 6,829,704 B2 | 12/2004 | Zhang | |
| 6,844,885 B2 | 1/2005 | Anderson | |
| 6,856,965 B1 | 2/2005 | Stinson | |
| 6,883,140 B1 | 4/2005 | Acker | |
| 6,902,105 B2 | 6/2005 | Koakutsu | |
| 6,913,188 B2 | 7/2005 | Wong | |
| 6,931,591 B1 | 8/2005 | Brown | |
| 6,934,719 B2 | 8/2005 | Nally | |
| 6,957,770 B1 | 10/2005 | Robinson | |
| 6,961,689 B1 | 11/2005 | Greenberg | |
| 6,970,843 B1 | 11/2005 | Forte | |
| 6,973,589 B2 * | 12/2005 | Wright et al. | 714/14 |
| 6,993,507 B2 | 1/2006 | Meyer | |
| 6,996,263 B2 | 2/2006 | Jones et al. | |
| 6,999,943 B1 | 2/2006 | Johnson | |
| 7,004,382 B2 | 2/2006 | Sandru | |
| 7,010,507 B1 | 3/2006 | Anderson | |
| 7,016,704 B2 * | 3/2006 | Pallakoff | 455/566 |
| 7,039,048 B1 | 5/2006 | Monta | |
| 7,058,036 B1 * | 6/2006 | Yu et al. | 370/335 |
| 7,062,768 B2 | 6/2006 | Kubo | |
| 7,086,003 B2 * | 8/2006 | Demsky et al. | 715/201 |
| 7,113,925 B2 | 9/2006 | Waserstein | |
| 7,114,649 B2 | 10/2006 | Nelson | |
| 7,139,594 B2 | 11/2006 | Nagatomo | |
| 7,140,539 B1 | 11/2006 | Crews | |
| 7,163,347 B2 | 1/2007 | Lugg | |
| 7,181,430 B1 | 2/2007 | Buchanan | |
| 7,184,980 B2 | 2/2007 | Allen-Rouman | |
| 7,197,173 B2 | 3/2007 | Jones et al. | |
| 7,200,255 B2 | 4/2007 | Jones | |
| 7,216,106 B1 | 5/2007 | Buchanan | |
| 7,249,076 B1 | 7/2007 | Pendleton | |
| 7,290,034 B2 | 10/2007 | Budd | |
| 7,299,970 B1 | 11/2007 | Ching | |
| 7,299,979 B2 | 11/2007 | Phillips | |
| 7,313,543 B1 | 12/2007 | Crane | |
| 7,321,874 B2 | 1/2008 | Dilip | |
| 7,321,875 B2 | 1/2008 | Dilip | |
| 7,325,725 B2 | 2/2008 | Foss, Jr. | |
| 7,343,320 B1 | 3/2008 | Treyz | |
| 7,349,566 B2 | 3/2008 | Jones et al. | |
| 7,377,425 B1 | 5/2008 | Ma | |

| | | |
|---|---|---|
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,421,107 B2 | 9/2008 | Lugg |
| 7,440,924 B2 | 10/2008 | Buchanan |
| 7,447,347 B2 | 11/2008 | Weber |
| 7,460,108 B2 | 12/2008 | Tamura |
| 7,461,779 B2 | 12/2008 | Ramachandran |
| 7,461,780 B2 | 12/2008 | Potts |
| 7,477,923 B2 | 1/2009 | Wallmark |
| 7,480,382 B2 | 1/2009 | Dunbar |
| 7,489,953 B2 | 2/2009 | Griffin |
| 7,490,242 B2 | 2/2009 | Torres |
| 7,497,429 B2 | 3/2009 | Reynders |
| 7,506,261 B2 | 3/2009 | Satou |
| 7,512,564 B1 | 3/2009 | Geer |
| 7,520,422 B1* | 4/2009 | Robinson et al. ............. 235/379 |
| 7,536,440 B2 | 5/2009 | Budd |
| 7,539,646 B2 | 5/2009 | Gilder |
| 7,540,408 B2* | 6/2009 | Levine et al. ................. 235/379 |
| 7,542,598 B2 | 6/2009 | Jones |
| 7,548,641 B2 | 6/2009 | Gilson et al. |
| 7,609,873 B2 | 10/2009 | Foth et al. |
| 7,620,231 B2 | 11/2009 | Jones |
| 7,647,275 B2 | 1/2010 | Jones |
| 7,672,940 B2 | 3/2010 | Viola |
| 7,702,588 B2 | 4/2010 | Gilder |
| 7,753,268 B1* | 7/2010 | Robinson et al. ............. 235/383 |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth |
| 2002/0001393 A1 | 1/2002 | Jones |
| 2002/0016763 A1 | 2/2002 | March |
| 2002/0032656 A1 | 3/2002 | Chen |
| 2002/0052841 A1 | 5/2002 | Guthrie |
| 2002/0052853 A1 | 5/2002 | Munoz |
| 2002/0065786 A1 | 5/2002 | Martens |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0138522 A1* | 9/2002 | Muralidhar et al. .......... 707/526 |
| 2002/0147798 A1 | 10/2002 | Huang |
| 2002/0150279 A1 | 10/2002 | Scott |
| 2002/0152160 A1 | 10/2002 | Allen-Rouman |
| 2002/0152161 A1 | 10/2002 | Aoike |
| 2002/0152164 A1 | 10/2002 | Dutta |
| 2002/0152169 A1 | 10/2002 | Dutta |
| 2002/0171820 A1 | 11/2002 | Okamura |
| 2002/0178112 A1 | 11/2002 | Goeller |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0075916 A1 | 4/2003 | Gorski |
| 2003/0081824 A1 | 5/2003 | Mennie |
| 2003/0093367 A1 | 5/2003 | Allen-Rouman |
| 2003/0105688 A1 | 6/2003 | Brown |
| 2003/0139999 A1 | 7/2003 | Rowe |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0233278 A1 | 12/2003 | Marshall |
| 2004/0010466 A1 | 1/2004 | Anderson |
| 2004/0012496 A1 | 1/2004 | De Souza |
| 2004/0024626 A1 | 2/2004 | Bruijning |
| 2004/0024708 A1 | 2/2004 | Masuda |
| 2004/0030741 A1 | 2/2004 | Wolton |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0078299 A1 | 4/2004 | Down-Logan |
| 2004/0080795 A1 | 4/2004 | Bean |
| 2004/0093303 A1 | 5/2004 | Picciallo |
| 2004/0093305 A1 | 5/2004 | Kight |
| 2004/0103296 A1 | 5/2004 | Harp |
| 2004/0109596 A1 | 6/2004 | Doran |
| 2004/0117302 A1 | 6/2004 | Weichert |
| 2004/0122754 A1 | 6/2004 | Stevens |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0236647 A1 | 11/2004 | Acharya |
| 2004/0236688 A1 | 11/2004 | Bozeman |
| 2004/0245324 A1 | 12/2004 | Chen |
| 2004/0248600 A1* | 12/2004 | Kim .............................. 455/466 |
| 2004/0252679 A1 | 12/2004 | Williams |
| 2004/0260636 A1 | 12/2004 | Marceau |
| 2004/0267666 A1 | 12/2004 | Minami |
| 2005/0033645 A1 | 2/2005 | Duphily |
| 2005/0033685 A1 | 2/2005 | Reyes |
| 2005/0033695 A1 | 2/2005 | Minowa |
| 2005/0038754 A1 | 2/2005 | Geist |
| 2005/0044042 A1* | 2/2005 | Mendiola et al. ............... 705/42 |
| 2005/0044577 A1 | 2/2005 | Jerding |
| 2005/0049950 A1 | 3/2005 | Johnson |
| 2005/0075969 A1 | 4/2005 | Nielson et al. |
| 2005/0078336 A1 | 4/2005 | Ferlitsch |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1* | 8/2005 | Brown ............................ 705/64 |
| 2005/0182710 A1 | 8/2005 | Andersson |
| 2005/0188306 A1 | 8/2005 | Mackenzie |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya |
| 2005/0268107 A1* | 12/2005 | Harris et al. .................. 713/182 |
| 2005/0269412 A1 | 12/2005 | Chiu |
| 2005/0278250 A1 | 12/2005 | Zair |
| 2005/0281471 A1 | 12/2005 | LeComte |
| 2005/0289030 A1 | 12/2005 | Smith |
| 2006/0004660 A1 | 1/2006 | Pranger |
| 2006/0025697 A1 | 2/2006 | Kurzweil |
| 2006/0039629 A1 | 2/2006 | Li |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0080245 A1 | 4/2006 | Bahl |
| 2006/0085357 A1 | 4/2006 | Pizarro |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu |
| 2006/0118613 A1 | 6/2006 | McMann |
| 2006/0144924 A1 | 7/2006 | Stover |

| | | | |
|---|---|---|---|
| 2006/0144950 A1 | 7/2006 | Johnson | |
| 2006/0161501 A1 | 7/2006 | Waserstein | |
| 2006/0206506 A1 | 9/2006 | Fitzpatrick | |
| 2006/0214940 A1 | 9/2006 | Kinoshita | |
| 2006/0229976 A1 | 10/2006 | Jung | |
| 2006/0229986 A1* | 10/2006 | Corder | 705/45 |
| 2006/0238503 A1 | 10/2006 | Smith | |
| 2006/0242062 A1 | 10/2006 | Peterson | |
| 2006/0242063 A1 | 10/2006 | Peterson | |
| 2006/0249567 A1 | 11/2006 | Byrne | |
| 2006/0279628 A1 | 12/2006 | Fleming | |
| 2006/0282383 A1 | 12/2006 | Doran | |
| 2007/0016796 A1* | 1/2007 | Singhal | 713/183 |
| 2007/0019243 A1 | 1/2007 | Sato | |
| 2007/0022053 A1 | 1/2007 | Waserstein | |
| 2007/0031022 A1 | 2/2007 | Frew | |
| 2007/0050292 A1 | 3/2007 | Yarbrough | |
| 2007/0058851 A1 | 3/2007 | Quine | |
| 2007/0063016 A1 | 3/2007 | Myatt | |
| 2007/0075772 A1 | 4/2007 | Kokubo | |
| 2007/0077921 A1 | 4/2007 | Hayashi | |
| 2007/0080207 A1 | 4/2007 | Williams | |
| 2007/0082700 A1 | 4/2007 | Landschaft | |
| 2007/0084911 A1 | 4/2007 | Crowell | |
| 2007/0086642 A1 | 4/2007 | Foth | |
| 2007/0086643 A1 | 4/2007 | Spier | |
| 2007/0094088 A1 | 4/2007 | Mastie | |
| 2007/0100748 A1 | 5/2007 | Dheer | |
| 2007/0118472 A1 | 5/2007 | Allen-Rouman | |
| 2007/0129955 A1 | 6/2007 | Dalmia | |
| 2007/0136198 A1 | 6/2007 | Foth et al. | |
| 2007/0140594 A1 | 6/2007 | Franklin | |
| 2007/0143208 A1 | 6/2007 | Varga | |
| 2007/0156438 A1 | 7/2007 | Popadic | |
| 2007/0168265 A1 | 7/2007 | Rosenberger | |
| 2007/0171288 A1 | 7/2007 | Inoue | |
| 2007/0179883 A1 | 8/2007 | Questembert | |
| 2007/0194102 A1 | 8/2007 | Cohen | |
| 2007/0198432 A1 | 8/2007 | Pitroda | |
| 2007/0208816 A1* | 9/2007 | Baldwin et al. | 709/206 |
| 2007/0241179 A1 | 10/2007 | Davis | |
| 2007/0255652 A1 | 11/2007 | Tumminaro | |
| 2007/0255653 A1* | 11/2007 | Tumminaro et al. | 705/39 |
| 2007/0258634 A1 | 11/2007 | Simonoff | |
| 2007/0295803 A1* | 12/2007 | Levine et al. | 235/379 |
| 2008/0002911 A1 | 1/2008 | Eisen | |
| 2008/0021802 A1 | 1/2008 | Pendleton | |
| 2008/0040280 A1 | 2/2008 | Davis | |
| 2008/0052182 A1 | 2/2008 | Marshall | |
| 2008/0059376 A1 | 3/2008 | Davis | |
| 2008/0063253 A1 | 3/2008 | Wood | |
| 2008/0071721 A1 | 3/2008 | Wang | |
| 2008/0080760 A1 | 4/2008 | Ronca | |
| 2008/0086421 A1 | 4/2008 | Gilder et al. | |
| 2008/0097899 A1 | 4/2008 | Jackson | |
| 2008/0103790 A1 | 5/2008 | Abernethy | |
| 2008/0113674 A1* | 5/2008 | Baig | 455/456.3 |
| 2008/0117991 A1 | 5/2008 | Peddireddy | |
| 2008/0119178 A1 | 5/2008 | Peddireddy | |
| 2008/0133411 A1 | 6/2008 | Jones et al. | |
| 2008/0147549 A1 | 6/2008 | Ruthbun | |
| 2008/0156438 A1 | 7/2008 | Stumphauzer | |
| 2008/0177659 A1* | 7/2008 | Lacey et al. | 705/42 |
| 2008/0214180 A1* | 9/2008 | Cunningham et al. | 455/422.1 |
| 2008/0219543 A1 | 9/2008 | Csulits | |
| 2008/0247629 A1 | 10/2008 | Gilder | |
| 2008/0249931 A1 | 10/2008 | Gilder | |
| 2008/0262953 A1 | 10/2008 | Anderson | |
| 2009/0108080 A1 | 4/2009 | Meyer | |
| 2009/0141962 A1* | 6/2009 | Borgia et al. | 382/139 |
| 2009/0171819 A1 | 7/2009 | Von der Emde et al. | |
| 2009/0171825 A1* | 7/2009 | Roman | 705/35 |
| 2009/0173781 A1 | 7/2009 | Ramachandran | |
| 2009/0190823 A1 | 7/2009 | Walters | |
| 2009/0252437 A1 | 10/2009 | Li | |
| 2009/0281904 A1* | 11/2009 | Pharris | 705/17 |
| 2009/0313167 A1 | 12/2009 | Dujari | |
| 2010/0007899 A1 | 1/2010 | Lay | |
| 2010/0082470 A1* | 4/2010 | Walach et al. | 705/35 |

OTHER PUBLICATIONS

EFT Network Unveils FAXTellerPLUS, Jan. 13, 2009, www.eftnetwork.com (faxteller).*

Amber Avalona-Butler/Paraglide, At Your Service: Best iPhone apps for military lifestyle, Jul. 9, 2010 (iPhone).*

Patterson, Scott: "USAA Deposit@Home—Another WOW moment for 'Net Banking", NextCU.com, 2007, 5 pages.

White, J.M. et ai, "ImageThreshoulding for Optical Character Recognition and Other Applications Requiring Character Image Extraction", IBM J. Res. Develop, 1983, vol. 27.

Ritzer, J.R. "Hinky Dinky helped spearhead POS, remote banking movement", Bank System & Equipment, vol. 21, No. 12 pp. 51-54, Dec. 1984.

Dinan, R.F. Dinan et al., "ImagePlus High Performance Transaction System", IBM Systems Journal; 1990, pp. 431-434; vol. 29, No. 3.

Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.

Masonson, L. "Check truncation and ACH trends—automated clearing houses," healthcare financial management association, http://WWN.findarticles.com/p/articles/mLm3276/is_n7_v47/ai_14466034/print, 1993.

Zhang, C.Y., "Robust Estimation and Image Combining," Astronomical Data Analysis Software and Systems IV, ASP Conference Series, 1995.

Kornai Andras et al., "Recognition of Cursive Writing on Personal Checks," Proceedings of International Workshop on the Frontiers in Handwriting Recognition, Sep. 1996, pp. 1-6.

De Queiroz, Ricardo et al., "Mixed RasterContent (MRC) Model for Compound Image Compression", pp. 1-12.

Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998.

J.D. Tygar, Atomicity in Electronic Commerce, Apr./May 1998 (Atomicity).

Anderson, Milton M. "FSML and Echeck", Financial Services Technology Consortium, 1999.

"Full Service Direct Deposit," www.nonprofitstaffing.com/images/upload/dirdepform.pdf, 2001.

Craig, Ben; "Resisting Electronic Payment Systems: Burning Down the House?", Federal Reserve Bank of Cleveland, Jul. 1999.

Rose, Sarah et al., "Best of the Web": The Top 50 Financial Websites." Money, New York Feb. 1999, vol. 28, iss12; pp. 178-187.

Furst, Karen et ai., "Internet Banking: Developments and Prospects", Office of the Comptroller of the Currency—Economic and Policy Analysis Working Paper 2000-9,9/2000.

Middleware', URL: http://www.cs.umanitoba.ca/maheswar/anc2002/PAPERS/bak01.pdf, Jun. 24, 2008.

Palacios, Rafael et al., "Automatic Processing of Brazilian Bank Checks", Machine Vision and Applications; 2002, pp. 1-28.

Peter, J. Wallison, "Wal-Mart Case Exposes Flaws in Banking-Commerce Split", American Banker, vol. 167. No. 8, Jan. 17, 2002.

Heckenberg, D., "Using Mac OSX for Real-Time Image Processing," 2003.

Burnett, J., "Depository Bank Endorsement Requirements," Bankersonline.com, http://www.bankersonline.com/cgi-ban/printview.pl, 2003.

Blafore, Bonnie, "Lower Commissions, Fewer Amenities." Better Investing. Madison Heights: Feb. 2003, vol. 52, iss 6; pp. 50-51.

"Direct Deposit Authorization Form" www.umass.edu/humres/library/DDForm.pdf, 2003.

Electronic Billing Problem: The E-check is in the mail-American Banker-v168, n 95, 91, May 2003.

Oxley, Michael G., from committee on Financial Services; "Check Clearing for the 21 st Century Act", 108th Congress—1st session, House of Representatives, report 108-132, Jun. 2, 2003, pp. 1-20.

Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.

Knestout, Brian P. et al., "Banking Made Easy" Kiplinger's Personal Fiance, Washington :Jul. 2003, vol. 57 iss 7; pp. 44-47.

Oxley, Michael G, from the committee of conference; "Check Clearing for the 21st Century Act", 108th Congress- 1st Sessi9n, House of Representatives, Report 108-291 ,Oct. 1, 2003, pp. 1-27.

Public Law 108-100—108th Congress; "An Act-Check Clearing for the 21 st Century Act". Oct. 28, 2003, [H. R. 1474], 117 STAT. 1177, 12 USC 5001.

Johnson, ,Jennifer J., Secretary of Board; Federal Reserve System, 12 CFR Part 229, Regulation CC; "Availability of Funds and Collection of Checks", 2009, pp. 1-89.

Mohl, Bruce, "Banks Reimbursing ATM Fee to Compete With Larger Rivals." Boston Globe, Boston, MA., Sep. 2004, pp. 1E.

The Automated Clearinghouse, "Retail Payment Systems; Payment Instruments, Clearing and Settlement; The Automated Clearinghouse (ACH)," www.ffiec.gov/ffiecinfobase/booklets/retailretail_02d.html, Dec. 2005.

"Two Words Every Business Should Know: Remote Deposit," Canon, http://www.rpsolutions.com/rpweb/pdfs/ canon_rdc.pdf, 2005.

Wells Fargo 2005 News Releases, "The New Wells Fargo Electronic Deposit Services Break Through Banking Boundaries in the Age of Check 21", San Francisco Mar. 28, 2005, wwwwellsfargo.com/press/3282005_check21? year=2005.

Constanzo, Chris "Remote Check Deposit: Wells Captures A New Checking Twist", Bank Technology News Article—May 2005. www.americanbanker.com/btn_article.html?id=20050502YQ50FSG>.

Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.

Credit Union Journal, "AFCU Averaging 80 DepositHome Transactions Per Day", Credit Union Journal, Aug. 15, 2005.

Federal Check 21 Act, "New Check 21 Act effective Oct. 28, 2004: Bank No Longer Will Return Original Cancelled Checks," Consumer Union's FAQ's and Congressional Testimony on check 21, www.consumerlaw.orglinitiativesl contentlcheck21—content.html.

BankServ, "depositNow: What's the difference?", 2006, DepositNow.

http://www.bankserv.com/products/remoteddeposithtm, 2006, Bankserv.

Blue Mountain Consulting, from URL: www.bluemountainconsulting.com. Apr. 26, 2006.

Remotedepositcapture, URL: www.remotedepositcapture.com, 2006.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www/federalreserve.org/Pubsregccregcc.htm, Jan. 24, 2006, 6 pgs.

Chiang, Chuck Chiang, The Bulletin, "Remote banking offered", Feb. 1, 2006, http://bendbulietin.com/apps/pbcs.dll/article? AID=/20060201/BIZ0102/60201 0327&tempi . . . .

Federal Reserve Board, "Check Clearing for the 21st Century Act," FRB, http://www.federalreserve.gov/paymentsystems/turncation/, 2006.

Fest, G., "Patently Unaware," Bank Technology News, *4/12006*, Retrieved from the internet at URL: http://banktechnews.com/article.html?id=20060403T7612618.

Bank Systems & Technology, Untitled Article, *5/112006*, http://www.banktech.com/showarticle.jhtml? articleID=187003126>, pp. 1-4, Copyright 2004-2005 CMP Media, LLC.

Digital Transactions News, "An ACH-Image Proposal for Check Roils Banks and Networks", May 26, 2006.

BankServ Press release, "BankServ Announces New Remote Deposit Product Integrated With QuickBooks", San Francisco, Jul. 6, 2006, Remotedepositcapture.com, pp. 1-3.

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.

Dias, Danilo et al., "A Model for the Electronic Representation of Bank Checks", Universidade de Brasilia.

"Check Fraud: A Guide to Avoiding Losses," All Net, http://all.netlbooks/auditlcheckfraud/security.htm, 2007.

"What is check Fraud," National Check Fraud Center, http://www.ckfraud.org/ckfraud.html, 2007.

"Remote Deposit," National City, http://www.nationalcity.com/smallbusiness/cashmanagementlremotedeposit ldefault.asp, 2007.

"Remote Deposit Capture," Plante & Moran, http://plantemoran.comlindustries/financialinstitutions/banklresourceslcommunity+bank+advisor/2007+summer+issue/remote+deposit+capture.htm, 2007.

"Virtual Bank Checks," Morebusiness.com, http://www.morebusiness.com/running_your_business/businessbitsld908484987.brc, 2007.

Canon, "ImageFormula CR-25, Improve Your Bottom Line With Front-Line Efficiencies", 0117W117, 1207-55/25-1 OM-BSP, 2007.

"It's the easiest way to switch banks," LNB, http://www.inbky.com/pdf/LNBswitch-kit10-07.pdf, 2007.

"Lesson 38—More Bank Transactions," Turtle Soft, http://www,turtlesoft.com/goldenseal-software-manual/lesson38. htm, 2007.

"Personal Finance," PNC, http://www.pnc.comlwebapp/unsec/productsandservice.do?sitearea=/PNC/home/personall account+services/quick+switch/quick+switch+faqs, 2007.

"Switching Made Easy," Bank of North Georgia, http://www.banknorthgeorgia.com/cmsmaster/documents/286/ documents616.pdf, 2007.

"Chapter 7 Payroll Programs," Uniform staff Payroll System, http://www2.oecn.k12.oh.us/www/ssd1/usps/usps_user_guide_005.html, 2007.

"Check 21 Solutions," Columbia Financial International, Inc. http://www.columbiafinanical.us/check21-solutions.htm, 2007.

"Direct Deposit", University of Washington, http://www.washington.edu/admin/payroll/directdeposit.html, 2007.

"Accept "Customer Not Present" Checks," Accept Check Online, http://checksoftware.com/, 2007.

"Customer Personalized Bank Checks and Address Lables" Checks Your Way, Inc., http://www.checksyourway.com/htm/web_pages/faq.htm, 2007.

"Direct Deposit Application for Payroll," Purdue, http://purdue.edu/payroll/pdf/directdepositapplication.pdf, 2007.

"Frequently Asked Questions," Bank of America, http://www.bankofamerica,com/deposits/checksave/index.cfm?template=1C_faq_bymail, 2007.

"Refractive index" wikipedia, the free encyclopedia; http://en.wikipedia.org/wiki/refractivejndex.

Patterson, Scott, "USAA Deposit@Home—Another WOW moment for Net Banking", NextCU.com, 2007.

Remotedepositcapture.com, LLC, "Remote Deposit Capture Overview," ROC Overview, http://remotedepositcapture.com/overview/RDC_overview.htm, Mar. 12, 2007.

Board of Governors of the federal reserve System, "Report to Congress on the Check Clearing for the 21 st Century Act of 2003" Apr. 2007, Submitted to the Congress pursuant to section 16 of the Check Clearing for the 21 st Century Act of 2003.

Image Master, "Photo Restoration: We specialize in digital photo restration and photograp repair of family pictures", http://www.imphotorepair.com, downloaded Apr. 2007.

"Save on ATM Fees", Chicago Tribune, Chicago, IL., Jul. 2007.

Association of German Banks, SEPA 2008: Uniform Payment Instruments for Europe, Berlin, Jul. 2007, Bundesverband deutscher banker eV.

Creativepaymentsolutions.com, "Creative Payment Solutions—Websolution", www.creativepaymentsolution.com/cps/financiaL services/websolution/default.html, copyright 2008, Creative Payment Solutions, Inc.

"How to Digitally Deposit a Check Image", Smart Money Daily, downloaded 2008.

DCU Member'S Monthly—Jan. 2008, "PC Deposit—Deposit Checks from Home!", http://www.mycreditunionnewsletter.com/dcu/01 08/pagel.html, pp. 1-2, copyright 2008 Digital Federal Credit Union.

"PC Deposit: Deposit Checks From Home!", Digital federal Credit Union, 2008.

Mitek Systems: Mitek Systems Launches First Mobile Check Deposit and Bill Pay Application, Jan. 22, 2008, San Diego, CA.

Windowsfordevices.com, "Software lets camera phone users deposit checks, pay bills", Jan. 29, 2008, www.windowsfordevices.com/news/NS3934956670.html.

Bruene, Jim; "Check Free to Enable In-Home Remote Check Deposit for Consumers and Small Business", NetBanker.com, Feb. 5, 2008, http://www.netbanker.com/2008/02/checkfree_to_enable_inhome_rem.html, 1995-2007, Financial Insite, Inc.

CNN.comltechnology, "Scan, deposit checks from home", Feb. 7, 2008, www.cnn.com/2008ITECH/biztech/02/07/check.scanning.ap/index.html.

"WallStreetGrapevine.com" stocks on the rise: JADG, BKYI, MITK; M2 presswire, Coventry: Mar. 3, 2008.

The Green Sheet 2.0: Newswire, "CO-OP adds home deposit capabilities to suite of check imaging products", www.greensheet.com/newswire.php?newswire_id=8799., 2009, pp. 1-2.

Matthews, Deborah, "Advanced Technology Makes Remote Deposit Capture Less Risky", Indiana Bankers Association, Apr. 2008.

Bruene, Jim; "Digital Federal Credit Union and Four Others Offer Consumer Remote Deposit Capture Through EasCorp", NetBanker—Tracking Online Finance, Apr. 13, 2008, www.netbanker.com/2008/04/ digitaUederal_credit_union_a.html, 1995-2007, FinancialInsite, Inc.

Credit Union Journal, "The Ramifications of Remote Deposit Capture Success", Credit Union Journal—Apr. 14, 2008, www.cujournaL.com/printthis.html?id=20080411 EODZT57G.

Wells Fargo Commercial, "Remote Deposit", www.wellsfargo.com/com/treasury_mgmtlreceivables/electronic/remote_deposit, 1999-2008, Wells Fargo.

Online deposit: faq, http://www.depositnow.com/faq.html Aug. 26, 2008.

"Adjusting Brightness and Contrast", www.eaglesoftware.com.

Mitek systems, Imagenet Mobile Deposit', San Diego, CA. 2 Pages.

Fisher, Dan M "Home Banking in the 21st century: Remote Capture Has Gone Retail", 4 pages.

Affinity Federal Credit Union, "Affinity announces online deposit," Aug. 4, 2005, Affinity Federal Credit Union.

"check 21—The check is not in the post", RedTitan Technology 2004./http://www.redtitan.com/check21/htm, 3 pgs.

Hartly, Thomas, "Banks Check Out New Image", Business First, Buffalo: Jul. 16, 2004, vol. 20, Iss 43, p. 1 , 3 pages.

Wade, Will, "Early Notes: Updating Consumers on Check 21" American Banker Aug. 10, 2004 (3 pages).

* cited by examiner

SYSTEMS AND METHODS FOR FINANCIAL DEPOSITS BY ELECTRONIC MESSAGE

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/257,471, and U.S. patent application Ser. No. 12/257,482, each filed on even date and entitled "Systems and Methods for Financial Deposit by Electronic Message."

BACKGROUND

Checks typically provide a safe and convenient method for an individual such as a payor to purchase goods and/or services. To use a check, the individual usually opens a checking account, or other similar account, at a financial institution and deposits funds, which are then available for later withdrawal. To pay for goods and/or services with a check, the payor (i.e., the buyer) usually designates a payee (i.e., the seller) and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee in return for the goods and/or services provided by the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller. To reduce such burdens for the payee, systems and methods have been developed to enable the remote deposit of checks. For example, the payee may scan a check in an electronic image using a scanning device and a computing device, and upload the check to the financial institution through a mechanism provided by the financial institution's website. The financial institution may then receive from the payee the electronic image of the check. However, such a technique requires the user to log into the website and navigate a sequence of web pages to upload the images.

SUMMARY

An image of a negotiable instrument may be provided from a user to a financial institution so that an image of the negotiable instrument may be obtained from the image and deposited in a user's bank account.

In an implementation, an image of a negotiable instrument may be communicated from a user to a financial institution using a messaging application to deposit funds associated with a negotiable instrument into a user's bank account. In an implementation, a user may use an instant messaging application to establish a communications session with a predetermined account (e.g., "buddy" or "friend") at the financial institution to communicate the image. The image may be stored in a file or created by a capture device under control of the instant messaging application. The image file may be processed and verified by the financial institution, where it may be deposited in an account associated with the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
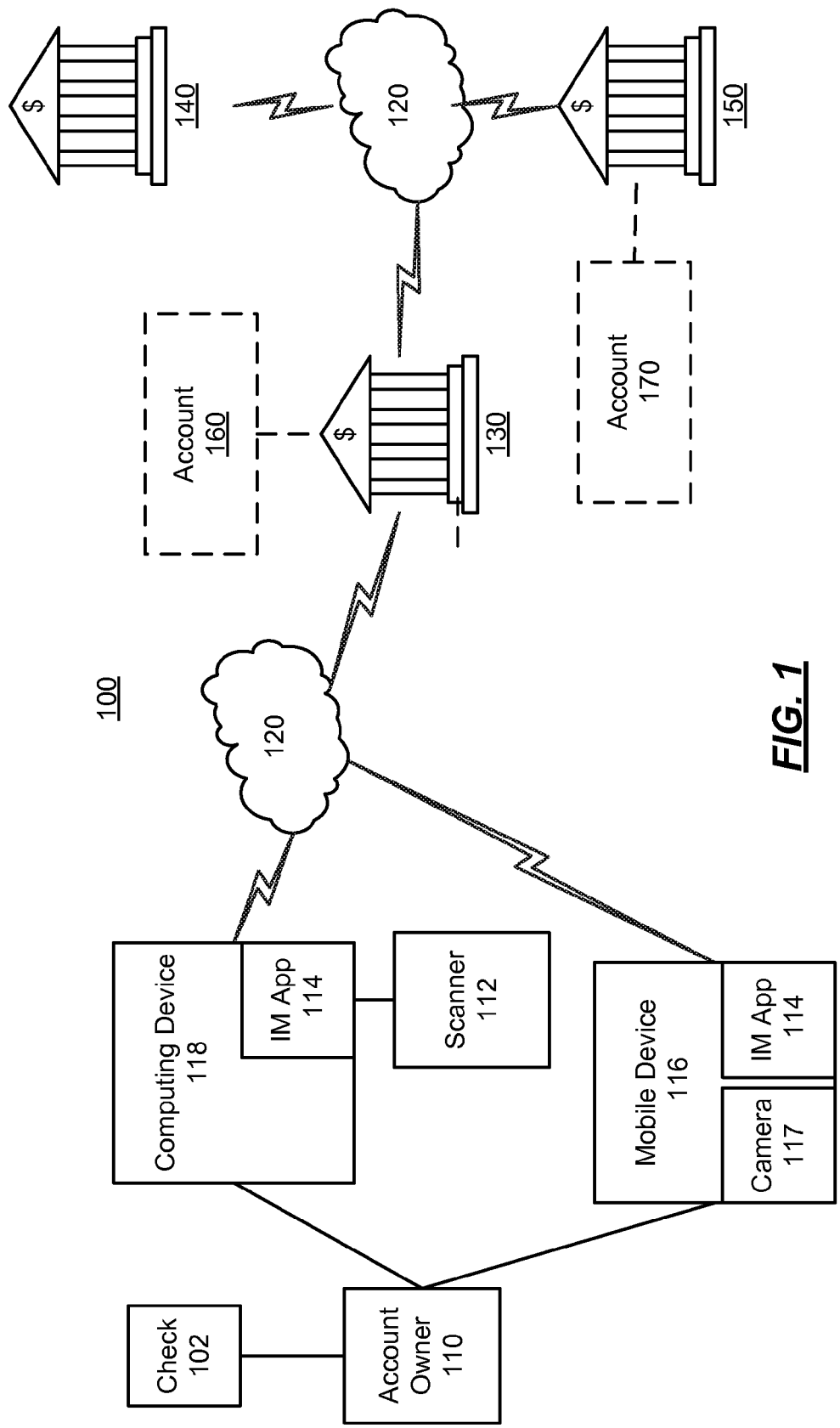
FIG. 1 is a block diagram of an example environment in which aspects of the present disclosure may be implemented.

FIG. 1 is a block diagram of an example environment 100 in which aspects of the present disclosure may be implemented. Environment 100 may include account owner 110 (also referred to herein as a user) and financial institutions 130, 140 and 150, which may be any type of entity capable of processing a transaction involving a negotiable instrument. For example, financial institutions 130, 140 and 150 may be a retail bank, an investment bank, an investment company, a regional branch of the Federal Reserve, a clearinghouse bank and/or a correspondent bank. A negotiable instrument typically includes a type of contract that obligates one party to pay a specified sum of money to another party. Negotiable instruments may include a check, a draft, a bill of exchange, a promissory note, and the like.

Account owner 110 may be an individual who owns account 160 that may be held at financial institution 130. Account 160 may be any type of account for depositing funds, such as a savings account, a checking account, a brokerage account, and the like. Account owner 110 may communicate with financial institution 130 by way of communications network 120 such as an intranet, the Internet, a local area network (LAN), a wide area network (WAN), a public switched telephone network (PSTN), a cellular network, a voice over Internet protocol (VoIP) network, Wi-Fi, and the like. Account owner 110 may communicate with financial institution 130 by phone, email, instant messaging, facsimile, and the like. Financial institutions 130, 140 and 150 also may communicate with each other by way of communications network 120.

In an implementation, account owner 110 may receive payment from another individual such as a payor in the form of a check 102 or other negotiable instrument that is drawn from account 170 at financial institution 150. Account owner 110 may endorse the check 102 (e.g., sign the back of the check 102) and indicate an account number on the check 102 for depositing the funds. It is noted that although examples described herein may refer to a check, the techniques and systems described herein are contemplated for, and may be used for, deposit of any negotiable instrument.

As described further herein, an image of a check or other negotiable instrument may be provided from a user to a financial institution using a messaging application (e.g., an instant message application, e-mail application, etc.) so that an image of the check or negotiable instrument may be may be deposited in a user's bank account. For example, account owner 110 may deposit the check 102 into account 160 by launching an instant messenger application 114 on either a computing device 118 (e.g., a personal computer) or a mobile device 116 (e.g., a PDA, handheld computing device, a wireless handset, etc.) and communicating an image of the check 102 to the financial institution 130 that is captured by a capture device such as a scanner 112 or camera 117 under control of the instant messenger application 114, or that is contained in an electronic file stored in a persistent medium.

For example, after endorsing the check 102, account owner 110 may use a the computing device 118 or mobile device 116 to launch the instant messaging application 114 to contact an instant messaging "buddy" or "friend" set up by the financial institution 130 to receive deposits from account holders. The "buddy" or "friend" account may be an automated account process that executes on a server or other computing device associated with the financial institution 130. The account owner 110 may converse with the "buddy" or "friend" to receive instructions to image the check 102 (using the scanner 112 or capture device 117) or to upload a previously obtained image of the check 102. The check image is communicated to the financial institution buddy or friend account for verification and funds are deposited into the account 160.

Figure 4:
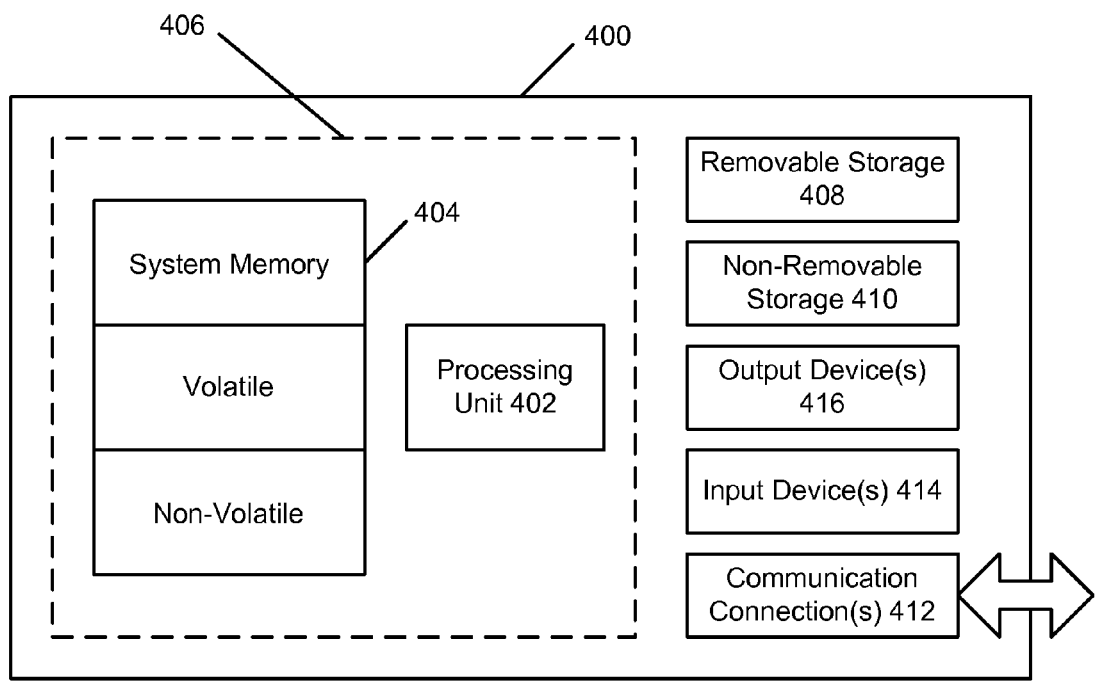
FIG. 4 is a block diagram of an example computing environment.

An example computing device 118/mobile device 116 is described with respect to FIG. 4. In addition to the scanner 112 or capture device 117, other capture devices may be used in the generation and/or transmission of the image data file in combination with the instant messaging application 114.

Financial institution 130 may receive the image data file representing the check 102 and may use any known image processing software or other application(s) to obtain the relevant data of the check 102 from the image. Financial institution 130 may determine whether the financial information associated with a negotiable instrument may be valid. For example, financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the image data file from the payee (e.g., account holder 110).

The electronic devices may receive the image data file and may perform an initial analysis on the quality of the image in the image data file, the readability of the data contained therein, or the like. For example, the electronic devices may determine whether the account number, amount payable, and the like may be readable such that it may be parsed or otherwise obtained and processed by the financial institution to credit an account associated with the payee and debit an account associated with the payor.

Upon receipt and approval of the image data file, financial institution 130 may credit the funds to account 160. Financial institution 130 may clear the check 102 by presenting a digital image of the check 102 captured from the image data file to an intermediary bank, such as a regional branch of the Federal Reserve, a correspondent bank and/or a clearinghouse bank. For example, the check 102 may be cleared by presenting the digital image to financial institution 140, which may be a regional branch of the Federal Reserve, along with a request for payment. Financial institution 130 and 150 may have accounts at the regional branch of the Federal Reserve. Financial institution 130 may create a substitute check using the image provided by account owner 110 and present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Other routing codes, such as business checks, money orders, Treasury Checks may be used to identify the paying financial institution. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that the present disclosure is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

Figure 2:
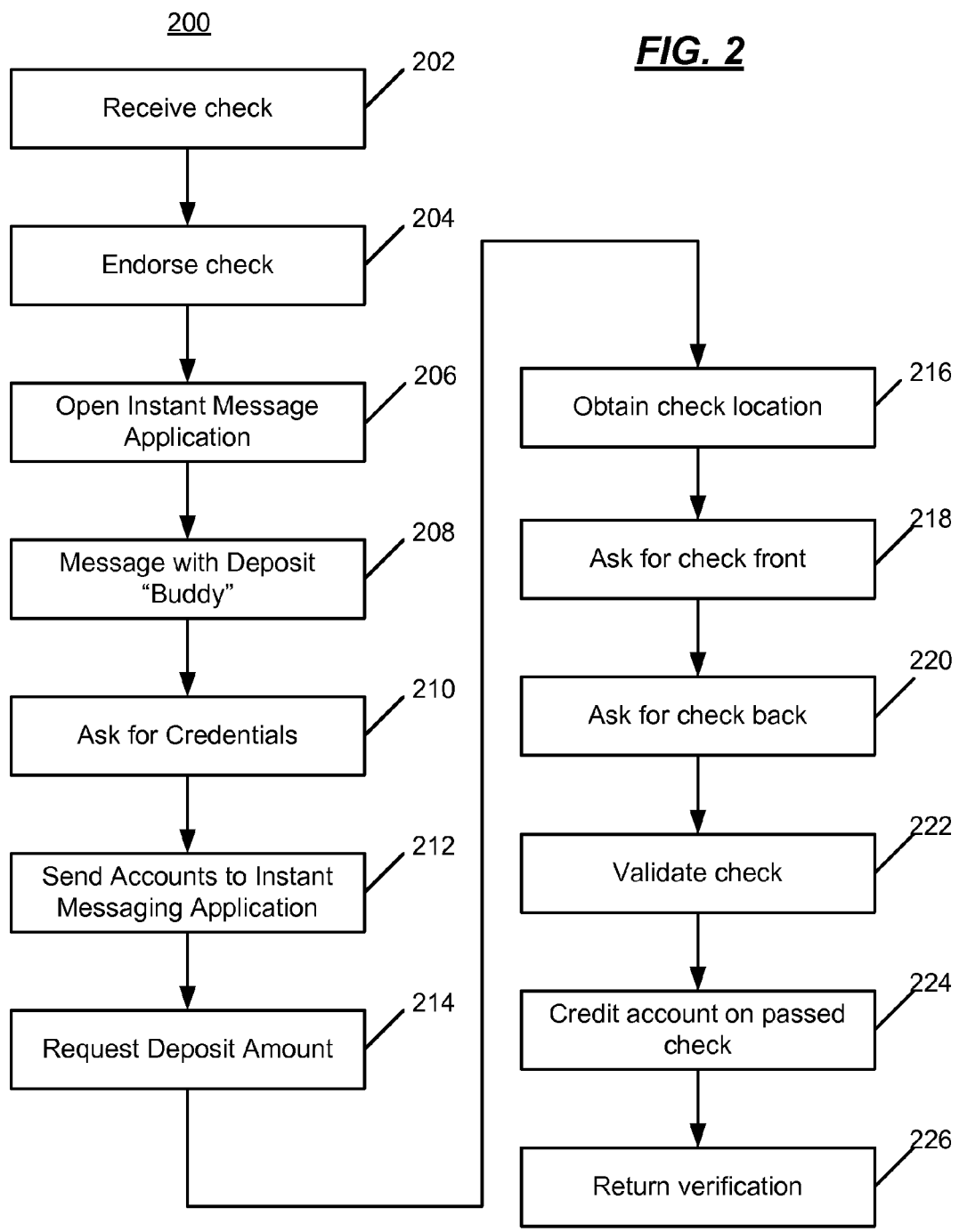
FIG. 2 is an operational flow of an implementation of a method that may be used to deposit a negotiable instrument using a messaging application.

A check or other negotiable instrument may be deposited in a financial institution, such as a bank, using a stored image of the check or negotiable instrument that the user sends to the financial institution. FIG. 2 is an operational flow of an implementation of a method 200 that may be used to deposit a negotiable instrument using a messaging application. At 202, an account owner (i.e., the payee, referred to herein as a user) may receive a check from a third party (i.e., the payor). At 204, the user may endorse the check by signing the back of the check in the designated field. If the user wishes to deposit the check into an account, such as a savings and/or checking account, they also may write an account number below the signature.

At 206, the user opens an instant messaging application. For example, the user may launch the instant messaging application 114 on the computing device 118 or mobile device 116 to begin a communication session with a predetermined "buddy" or "friend" account set up by the financial institution 130 to receive deposits. At 208, the user begins messaging with the deposit "buddy" or "friend." For example, the user may enter the account name, user ID, or nickname of the "buddy" or "friend" into the instant messaging application 114.

At 210, the user is asked for credentials to authenticate the user with the financial institution. For example, the "buddy" or "friend" may ask the user for a username and password combination that the user may use to log onto, e.g., the financial institutions' website or account access portal for authentication. In some implementations, the authentication may be accomplished using biometric information communicated by the instant messaging application 114 (e.g., an image of a fingerprint, retina scan, voice print, etc.). The authentication information may be encrypted when communicated back to the financial institution 130 for added security. In some implementations, the user may register his/her instant messaging ID with the financial institution 130, where the registered ID serves as an authentication mechanism.

At 212, the "buddy" or "friend" sends a list of accounts to user via the instant messaging application. In an implementation, the financial institution 130 may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the financial institution using the instant messaging application 114, which may process the deposit request according to the image data file, the secondary data, and the selected account.

At 214, the user is requested to indicate a deposit amount. In accordance with the selected accounts at 212, the user may indicate a portion of the deposit amount is to be deposited in each of the accounts identified at 212, or that the total deposit is to be deposited into a single account, etc.

At 216, a check image is obtained from the user. The user may indicate that an image data file containing an image of the check or negotiable instrument is available for upload. Alternatively or additionally, the user may indicate that an image of the check or negotiable instrument needs to be created. At 218, the user is asked for an image of the front of the check or negotiable instrument. Where the user has previously created an image of the check or negotiable instrument, a user may be prompted using a dialog box to upload the saved image data file, which would then be uploaded to the financial institution 130. In implementations where the user needs to create a image data file of a front of the check, the user may be prompted through the instant messaging application 114 to create the image data file using a scanner, a camera, a webcam, a camera phone, a web-enabled device, a camcorder, a computer camera, a personal computer (PC), and the like. In some implementations, the instant message may be converted from text to speech to interact with an interactive voice response (IVR) system to execute the deposit transaction. The newly-created image data file containing the image of the front of the check may then be transmitted to the financial institution 130 using the instant messaging application 114.

Similarly, at 220, the user is asked for an image of the back of the check. An image data file containing an image of the back of the check may be selected and uploaded, or created in a similar fashion as described at 218 with regard to the front of the check. The image data file containing the image of the back of the check may then be transmitted to the financial institution 130 using the instant messaging application 114.

In some implementations, the image data file communicated at 218 and 220 may be augmented by secondary data which may be information relating to the check, such as an account number, a deposit amount, or a routing number associated with the check, and/or relating to the account for depositing funds, such as the account number and/or the name on the account. The information may be entered as speech to text (IM message), user keyed, or by an application reading/interpreting the image to extract the appropriate information. The account number may appear on the check itself, below the signature endorsing the check. The account number and/or name on the account also may appear in an email, either with or without the image data file, for example. The user may send the image data file and the secondary data to the financial institution along with a request to deposit the check into a particular user account using the instant messaging application 114. For example, if a Magnetic Ink Character Recognition (MICR) misread occurs in check data extracted from the check, the user may be asked to enter the missing information by instant message the number with missing characters as stars or the like. This would lower the amount of backend processing.

At 222, the financial institution may open the image data file(s) and process the image using known techniques to retrieve information regarding the check. Example technologies that may be used by the financial institution may include image editing, video analytics, filtering to remove imagery except the check in the received image, image sharpening, and technologies to distinguish between the front and the back sides of the check.

After retrieving the financial information from the check in an electronic form, the financial institution 130 may determine whether the financial information such as the amount payable to the user, the account associated with the user to deposit funds, an account associated with a payor to debit funds, and a financial institution associated with the payor and/or the payee may be valid. For example, the financial institution may include electronic devices such as computers, servers, databases, or the like that may be in communication with each other. The electronic devices may receive an electronic form of the check and may perform an initial analysis on the quality of the data representation of the check, the readability of the data representation, or the like. For example, the electronic devices may determine whether the account number, amount payable, or the like may be readable such that they may be parsed and processed by the financial institution to credit an account associated with the payee and debit an account associated with the payor. Also, in some implementations, real-time electronic security and/or fraud detection may be conducted at the time the image is received by the financial institution.

At 224, if the financial information is determined to be valid, the electronic data representation of the check may be processed by the financial institution, thereby depositing the check in the user's account. A verification may be returned to the user at 226 to indicate that funds have been deposited. Alternatively, an error may be returned is validation of the check did not pass such that the user may contact the financial institution. The user may receive the verification via email, facsimile, instant message, text message, voice message, or regular mail, for example, that the check has been deposited into the selected account. In an implementation, if the check is not successfully deposited by image deposit, the financial institution may provide additional options to the user on how to redeem the check, such as mailing the check to the financial institution or the like.

In some implementations, the user may be provided an option to save the communications session as proof of deposit or for archival purposes.

Figure 3:
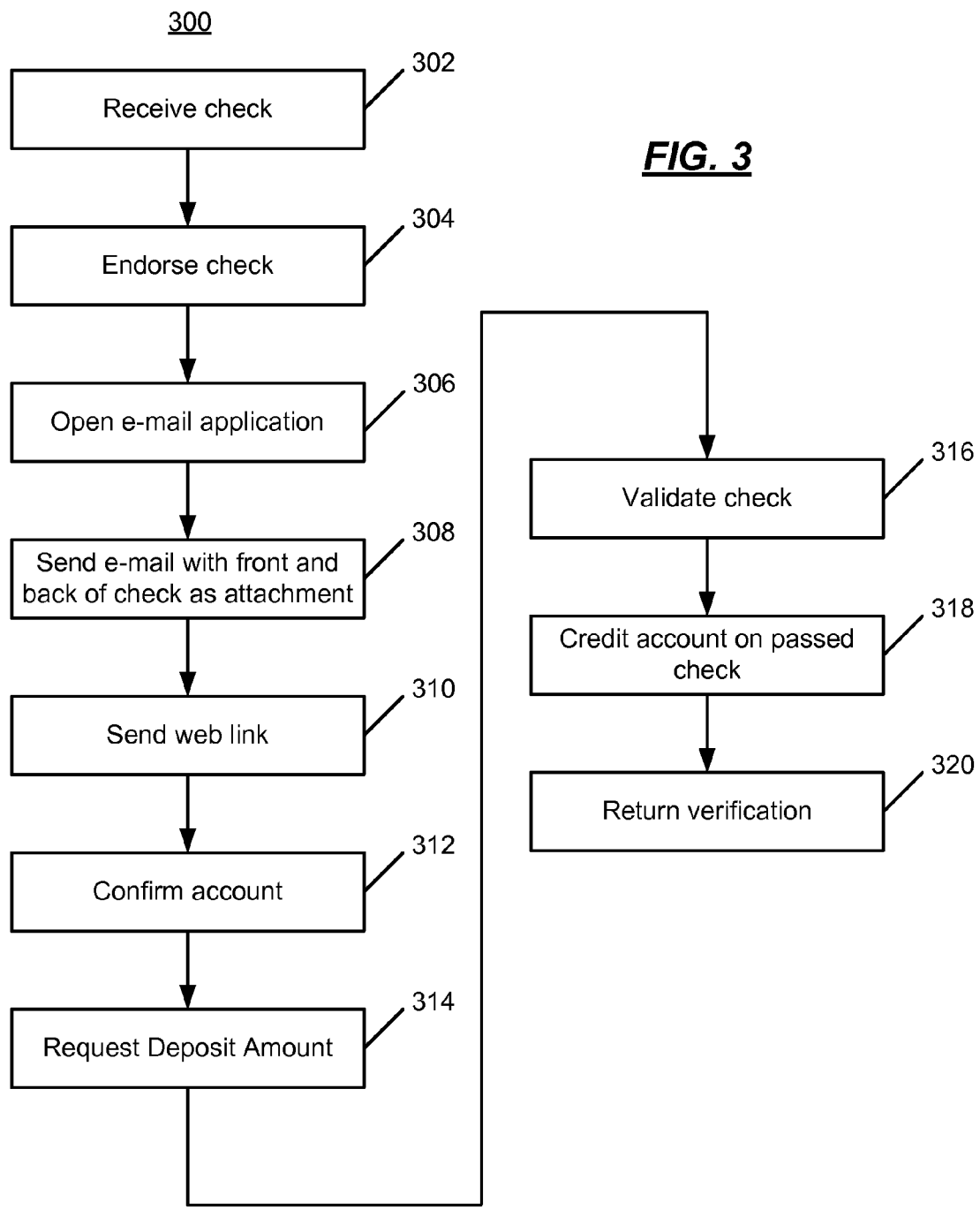
FIG. 3 is another operational flow of an implementation of a method that may be used to deposit a negotiable instrument using a messaging application.

FIG. 3 is another operational flow of an implementation of a method 300 that may be used to deposit a negotiable instrument using a messaging application. At 302, an account owner (i.e., the payee, referred to herein as a user) may receive a check from a third party (i.e., the payor). At 304, the user may endorse the check by signing the back of the check in the designated field. If the user wishes to deposit the check into an account, such as a savings and/or checking account, they also may write an account number below the signature.

At 306, the user opens an email messaging application. For example, the user may launch an email application on the computing device 118 or mobile device 116 to create an email addressed to a predetermined deposit email address at the financial institution 130 for depositing funds. At 308, the user sends an email to the deposit email address with images of the front and back of the check to be deposited as attachments. In some implementations, the image data files communicated 308 may be augmented by the secondary data, as noted above with regard to FIG. 2.

At 310, an email is sent to the user by the financial institution for authentication purposes. The email may communicated to user email address of record and may contain a one-time web link to confirm the user's identity. At 312, the web link may take the user to a web page to confirm a list of accounts associated with the user. The user may have one or more checking and/or savings accounts with the financial institution 130. In an implementation, the financial institution 130 may determine that there are multiple user accounts in which to deposit the check. The accounts may be presented to the user in a web page. The user may make a selection among a list of accounts in which to deposit the check.

At 314, the user is requested to indicate the deposit amount. In accordance with the selected accounts at 312, the user may indicate a portion of the deposit amount that is to be deposited in each of the accounts identified at 312, or that all of the amount is to be deposited into a single account.

At 316, the financial institution may open the image data file(s) and process the image, as noted above with regard to 222 in FIG. 2. For example, OCR/ICR imaging technology may be used by the financial institution to process the image. At 318, if the financial information is determined to be valid, the electronic data representation of the check may be processed by the financial institution, thereby depositing the check in the user's account. A verification may be returned to the user at 320 to indicate that the check has been deposited or that there has been an error and that the user should contact the financial institution.

FIG. 4 shows an exemplary computing environment. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as RAM), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 404, removable storage 408, and non-removable storage 410 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., using an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for depositing a negotiable instrument, comprising:
   instantiating an electronic instant messaging application at a depositor-owned device;
   establishing via an instant messaging protocol a communication session with a financial institution server via the electronic instant messaging application;
   providing user credentials to the financial institution server over the communications session via the instant messaging protocol by sending an instant message to a deposit instant messaging account via the electronic instant messaging application;
   verifying an account to which funds associated with the negotiable instrument are to be deposited; and
   communicating via the instant messaging protocol an image file containing an image of the negotiable instrument to the deposit instant messaging account using the electronic instant messaging application,
   wherein the image of the negotiable instrument is captured by the depositor-owned device.

2. The method of claim 1, further comprising receiving a verification that the negotiable instrument has been deposited to the account after communicating the image file.

3. The method of claim 1, further comprising saving the communications session.

4. The method of claim 1, wherein the image is received as an electronic file created by a capture device controlled by the electronic messaging application.

5. The method of claim 1, wherein the image of the negotiable instrument comprises a first image of a first side of the negotiable instrument and a second image of a second side of the negotiable instrument.

6. The method of claim 5, further comprising determining if the first image comprises valid financial information by verifying a courtesy amount field and a MICR line.

7. The method of claim 6, wherein the negotiable instrument is a check.

8. A computer-readable medium comprising computer-readable instructions for depositing a negotiable instrument, comprising:
   instantiating an electronic instant messaging application at a depositor-owned device;
   establishing via an instant messaging protocol a communication session with a financial institution server via the electronic instant messaging application;
   providing user credentials to the financial institution server over the communications session via the instant messaging protocol by sending an instant message to a deposit instant messaging account via the electronic instant messaging application;
   verifying an account to which funds associated with the negotiable instrument are to be deposited; and communicating via the instant messaging protocol an image file containing an image of the negotiable instrument to the deposit instant messaging account using the electronic instant messaging application,
   wherein the image of the negotiable instrument is captured by the depositor-owned device.

9. The computer-readable medium of claim 8, further comprising instructions for receiving a verification that the negotiable instrument has been deposited to the account after communicating the image file.

10. The computer-readable medium of claim 8, further comprising instructions for saving the communications session.

11. The computer-readable medium of claim 8, wherein the image is received as an electronic file created by a capture device controlled by the electronic messaging application.

12. The computer-readable medium of claim 8, wherein the image of the negotiable instrument comprises a first image of a first side of the negotiable instrument and a second image of a second side of the negotiable instrument.

13. The computer-readable medium of claim 12, further comprising instructions for determining if the first image comprises valid financial information by verifying a courtesy amount field and a MICR line.

14. The computer-readable medium of claim 13, wherein the negotiable instrument is a check.

15. A system for depositing a negotiable instrument, comprising:
   at least one system that instantiates an electronic instant messaging application at a depositor-owned device;
   at least one system that establishing via an instant messaging protocol a communication session with a financial institution server via the electronic instant messaging application;
   at least one system that provides user credentials to the financial institution server over the communications session via the instant messaging protocol by sending an instant message to a deposit instant messaging account via the electronic instant messaging application;
   at least one system that verifies an account to which funds associated with the negotiable instrument are to be deposited; and
   at least one system that communicates via the instant messaging protocol an image file containing an image of the negotiable instrument to the deposit instant messaging account using the electronic instant messaging application, wherein the image of the negotiable instrument is captured by the depositor-owned device.

16. The system of claim 15, further comprising at least one system that receives a verification that the negotiable instrument has been deposited to the account after communicating the image file.

17. The system of claim 15, further comprising at least one system that saves the communications session.

18. The system of claim 15, wherein the image is received as an electronic file created by a capture device controlled by the electronic messaging application.

19. The system of claim 15, wherein the image of the negotiable instrument comprises a first image of a first side of the negotiable instrument and a second image of a second side of the negotiable instrument.

20. The system of claim 19, further comprising at least one system that determines if the first image comprises valid financial information by verifying a courtesy amount field and a MICR line.

21. The system of claim 20, wherein the negotiable instrument is a check.

* * * * *